US010218743B2

(12) United States Patent
Seetharaman et al.

(10) Patent No.: US 10,218,743 B2
(45) Date of Patent: Feb. 26, 2019

(54) SYSTEMS AND METHODS OF INTENT-BASED LAWFUL INTERCEPTION (LI) IN COMMUNICATION NETWORKS

(71) Applicant: Wipro Limited, Bangalore (IN)

(72) Inventors: Swaminathan Seetharaman, Chennai (IN); Venkata Subramanian Jayaraman, Chennai (IN)

(73) Assignee: Wipro Limited, Bangalore (IN)

( * ) Notice: Subject to any disclaimer, the term of this patent is extended or adjusted under 35 U.S.C. 154(b) by 80 days.

(21) Appl. No.: 15/441,383

(22) Filed: Feb. 24, 2017

(65) Prior Publication Data
US 2018/0205763 A1 Jul. 19, 2018

(30) Foreign Application Priority Data
Jan. 13, 2017 (IN) .............................. 201741001408

(51) Int. Cl.
*H04L 29/06* (2006.01)
*H04L 12/24* (2006.01)
(Continued)

(52) U.S. Cl.
CPC .......... *H04L 63/30* (2013.01); *H04L 41/0631* (2013.01); *H04L 63/306* (2013.01);
(Continued)

(58) Field of Classification Search
CPC .... H04L 63/30; H04L 41/0631; H04L 65/608
See application file for complete search history.

(56) References Cited

U.S. PATENT DOCUMENTS

2010/0199189 A1 8/2010 Ben-Aroya et al.
2014/0328348 A1* 11/2014 de Santis ................ H04L 69/22
370/392
(Continued)

FOREIGN PATENT DOCUMENTS

WO WO 2013/069605 6/2013
WO WO 2014/169470 10/2014

OTHER PUBLICATIONS

"Lawful Interception (LI); Handover interface for the lawful interception of telecommunications traffic", *Technical Specification, European Telecommunications Standards Institute (ETSI)*, vol. LI, No. V3.14.1, Mar. 1, 2016.
(Continued)

*Primary Examiner* — Brian D Nguyen
(74) *Attorney, Agent, or Firm* — Finnegan, Henderson, Farabow, Garrett & Dunner, LLP

(57) ABSTRACT

This disclosure relates to intent based Lawful Interception (LI) in a communication network. The method includes interpreting an LI intent of a Law Enforcement Agency (LEA) based on LI intent information provided by the LEA; determining LI content required by the LEA and at least one LI trigger associated with the LI content based on an analysis of the LI intent information; monitoring ongoing communication session associated with an LI target user to detect matching of the at least one LI trigger; processing duplicated LI content in response to matching of the at least one LI trigger; inserting at least one marker tag in the duplicated LI content to generate marked LI content; and sending the marked LI content and a notification comprising information associated with matching of the at least one LI trigger and the at least one marker tag to the LEA.

18 Claims, 7 Drawing Sheets

(51) Int. Cl.
*H04W 12/02* (2009.01)
*H04L 12/707* (2013.01)

(52) U.S. Cl.
CPC .............. *H04W 12/02* (2013.01); *H04L 45/24* (2013.01); *H04L 65/608* (2013.01); *H04L 69/14* (2013.01)

(56) References Cited

U.S. PATENT DOCUMENTS

| | | | |
|---|---|---|---|
| 2016/0344774 A1* | 11/2016 | Westberg | H04L 63/306 |
| 2016/0344775 A1* | 11/2016 | Campagna | H04L 9/0861 |
| 2016/0373986 A1* | 12/2016 | Seetharaman | H04W 36/22 |
| 2017/0013022 A1* | 1/2017 | Buckley | H04L 9/0847 |
| 2017/0085704 A1* | 3/2017 | Rao | H04M 3/2281 |
| 2017/0093927 A1* | 3/2017 | Seetharaman | H04L 63/30 |
| 2017/0237779 A1* | 8/2017 | Seetharaman | H04L 63/306 726/30 |

OTHER PUBLICATIONS

Scharf, M., "Multi-Connection TCP (MCTCP) Transport; draft-scharf mctcp-mctcp-01", *Internet Engineering Task Force* Jul. 12, 2010, pp. 1-35.
Extended European Search Report issued in the European Patent Office in counterpart European Application No. 17163381.1, dated Oct. 9, 2017, 9 pages.
https://insidersurveillance.com/israels-nice-comprehensive-lawful-intercept-intelligence/, "Israel's NICE: Comprehensive Lawful Intercept and Intelligence", Aug. 26, 2014, 6 pages.

\* cited by examiner

SYSTEMS AND METHODS OF INTENT-BASED LAWFUL INTERCEPTION (LI) IN COMMUNICATION NETWORKS

TECHNICAL FIELD

This disclosure relates generally to Lawful Interception (LI) and more particularly to systems and methods of intent-based LI in communication networks.

BACKGROUND

In today's communication scenarios, heterogeneous networks and diverse protocols and interfaces are used for a single session of a particular user. In fact, new protocols, such as, Multipath Transmission Control Protocol (MPTCP), extensions to existing protocols, new interfaces and associated protocols are being continuously defined and evolved. Protocol-agnostic forwarding techniques are also being used, which facilitate transfer of packets without knowledge of the underlying protocols and their functions. In such a rapidly evolving communication infrastructure, increasing volume of users, user-traffic, and number of communication channels, for Lawful Interception (LI) to be effective, directed and appropriate LI tracking that is based on specific intent of the Law Enforcement Agency (LEA) is required.

In conventional LI techniques, all communications related to an LI target are intercepted and transmitted to the LEA, irrespective of whether such communication is relevant or not to the LEA for current investigation about an LI target. Thus, the LEA may receive large volumes of irrelevant data for an LI target. Significant time, effort, and resources are required for both transmitting this data as well as processing it to extract relevant information. As a result, significant delays may be caused that may hamper investigations. The problem is exacerbated in case of investigations that require (near) real-time gathering and extracting of relevant information, in order for the LEA to take appropriate actions in a timely manner. Additionally, with some of the new protocols, it is time consuming and error-prone for the LI to determine in real-time whether a particular content is associated with the LI target user or not (source or destination).

Conventional techniques thus fail to provide a mechanism of performing LI based on LEA specified intent for each LI session. These techniques also fail to ensure sending of relevant information to LEA in real-time basis for effective LI.

SUMMARY

In one embodiment, method of intent based Lawful Interception (LI) in a communication network is disclosed. The method includes interpreting, by a network device, an LI intent of a Law Enforcement Agency (LEA) based on LI intent information provided by the LEA; determining, by the network device, LI content required by the LEA and at least one LI trigger associated with the LI content based on an analysis of the LI intent information; monitoring, by the network device, ongoing communication session associated with an LI target user to detect match of the at least one LI trigger; processing, by the network device, duplicated LI content in response to activation of the at least one LI trigger, wherein the duplicated LI content captures at least a part of the LI content in the ongoing communication session of the LI target user; inserting, by the network device, at least one marker tag in the duplicated LI content to generate marked LI content; and sending, by the network device, the marked LI content and a notification comprising information associated with matching of the at least one LI trigger and the at least one marker tag to the LEA.

In another embodiment, a network device enabling intent based LI in a communication network is disclosed. The network device includes a processor; and a memory communicatively coupled to the processor, wherein the memory stores processor instructions, which, on execution, causes the processor to: interpret an LI intent of a Law Enforcement Agency (LEA) based on LI intent information provided by the LEA; determine LI content required by the LEA and at least one LI trigger associated with the LI content based on an analysis of the LI intent information; monitor ongoing communication session associated with an LI target user to detect matching of the at least one LI trigger; process duplicated LI content in response to matching of the at least one LI trigger, wherein the duplicated LI content captures at least a part of the LI content in the ongoing communication session of the LI target user; insert at least one marker tag in the duplicated LI content to generate marked LI content; and send the marked LI content and a notification comprising information associated with matching of the at least one LI trigger and the at least one marker tag to the LEA.

In yet another embodiment, a non-transitory computer-readable storage medium having is disclosed. The non-transitory computer-readable storage medium has instructions stored thereon, a set of computer-executable instructions for intent based LI in a communication network, causing a computer comprising one or more processors to perform steps comprising: interpreting, by a network device, an LI intent of a Law Enforcement Agency (LEA) based on LI intent information provided by the LEA; determining, by the network device, LI content required by the LEA and at least one LI trigger associated with the LI content based on an analysis of the LI intent information; monitoring, by the network device, ongoing communication session associated with an LI target user to detect match of the at least one LI trigger; processing, by the network device, duplicated LI content in response to matching of the at least one LI trigger, wherein the duplicated LI content captures at least a part of the LI content in the ongoing communication session of the LI target user; inserting, by the network device, at least one marker tag in the duplicated LI content to generate marked LI content; and sending, by the network device, the marked LI content and a notification comprising information associated with matching of the at least one LI trigger and the at least one marker tag to the LEA.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
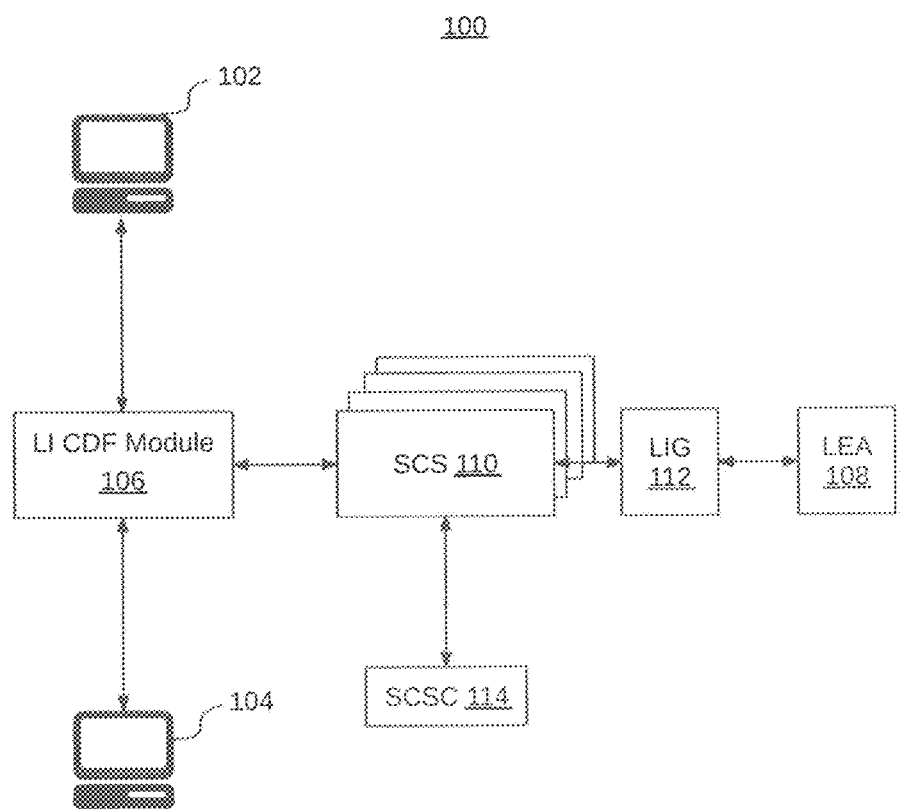
FIG. 1 illustrates an environment (that is exemplary) in which various embodiments may function.

Additional illustrative embodiments are listed below. In one embodiment, an environment 100 (that is exemplary) in which various embodiments may function is illustrated in FIG. 1. It will be apparent to a person skilled in the art that the invention is not limited to environment 100 and will work with similar proficiency in other environments that may or may not include various elements that are part of environment 100.

Environment 100 includes a target user 102 who is involved in a communication session with a peer user 104. The communication session may either be initiated by target user 102 or peer user 104. Target user 102 is identified for lawful interception, as a result, each communication session that involves target user 102 as a sender or a recipient is routed through a Lawful Interception (LI) Content Duplication Function (CDF) module 106. LICDF module 106 intercepts all communication sessions involving target user 102 and performs content duplication. The functionality of LICDF module 106 may be built in a network device or node within a network of target user 102. The network device or node is configured to perform data duplication. Examples of these network devices or nodes may include, but are not limited to Routers, Switches, Media Servers, Gateways, Bridges, Modems, HUB, and Multistation Access Unit (MAU). LICDF module 106 creates a copy of the contents of each communication session and sends these copies to a Law Enforcement Agency (LEA) 108 through a Session Continuity Server (SCS) 110 and an LI Gateway (LIG) 112. For simplicity only one LICDF module 106 is shown in environment 100. In reality, there may be several LICDF modules 106 which may be configured to perform data duplication for different sessions involving target user 102, depending on the nature of the session (for example, voice session, browsing session, video download, etc.), the access network used (for example, fixed access, 2G/3G/4G/5G cellular access, Wi-Fi access, etc.), network nodes that would be involved in the session (for example, media gateways involved in an IMS session, PDN Gateway involved in an LTE session, etc.), etc.

An SCS controller (SCSC) 114 selects a network device or node that performs functionality of LICDF module 106 for a communication session involving the target user 102 based on one or more of pre-provisioning by the operator, dynamic network conditions, and session characteristics. Accordingly, the selected network device or node initiates LI and acts as LICDF module 106. Thereafter, LICDF module 106 starts sending copies of data packets in a communication session between target user 102 and peer user 104 to SCS 110.

Thereafter, SCS 110 performs suitable formatting and sequencing on data packets received from LICDF module 106 and sends these data packets to LIG 112. LIG 112 further sends these data packets exchanged between target user 102 and peer user 104.

Alternate environments may just include an LICDF module 106 without a SCSC 114 and SCS 110.

Figure 2:
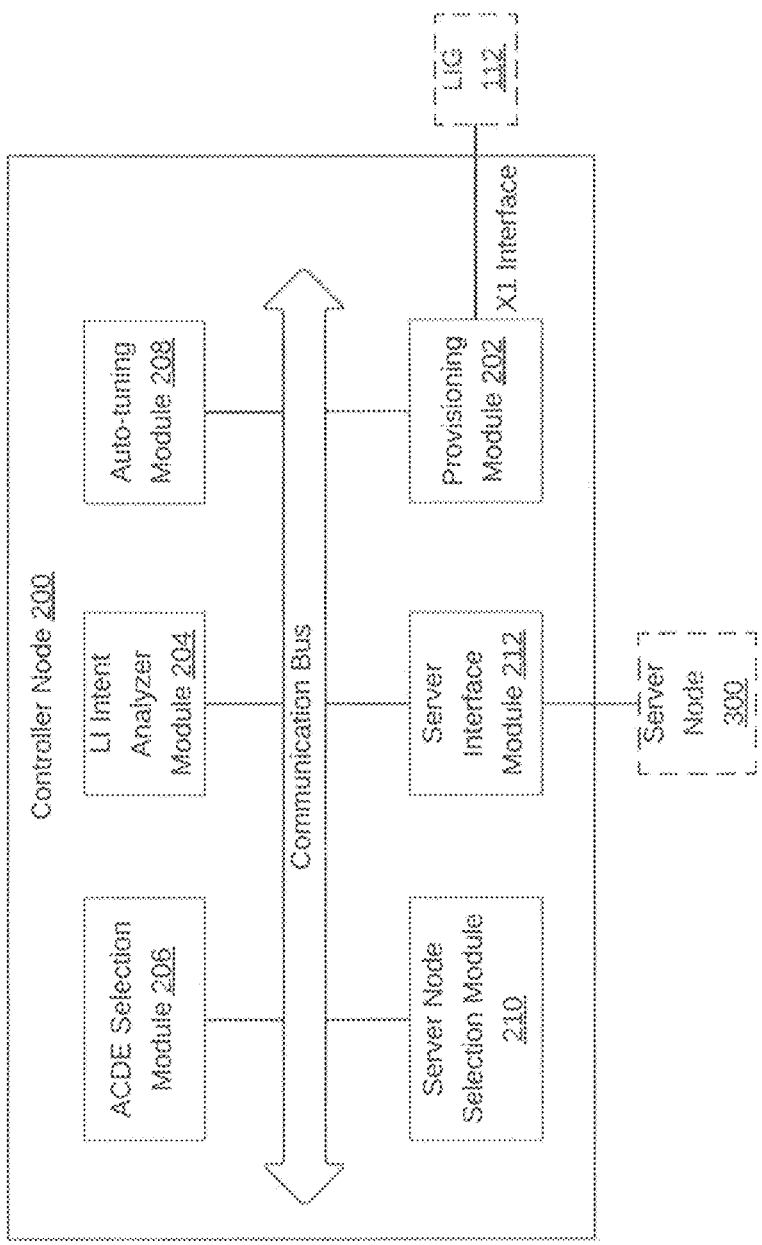
FIG. 2 is a block diagram illustrating various modules of a controller node for intent based LI in a communication network, in accordance with an embodiment.

Referring now to FIG. 2, a block diagram of various modules of a controller node 200 for intent based LI in a communication network is illustrated, in accordance with an embodiment. In an embodiment, controller node 200 may be an SCSC.

Controller node 200 communicates with LEA 108 via LIG 112 and this communication is facilitated by an X1 interface between a provisioning module 202 and LIG 112. To enable LI, provisioning module 202 receives provisioned inputs (for example, LI target user identity and Internet Protocol (IP) addresses) from LEA 108. Provisioning module 202 also receives additional information from LEA 108, which may include, but is not limited to LI intent information. The LI intent information is associated with an LI intent of LEA 108 and includes one or more of, but is not limited to service type (for example, voice call, conference, or video), location of the LI target user (for example, specific location, or geographical regions), access network type of the LI target user (for example, Wi-Fi, Long Term Evolution (LTE), Global System for Mobile communication (GSM), Worldwide Interoperability for Microwave Access (WiMAX), Light Fidelity (Li-Fi), or Code Division Multiple Access (CDMA), session type (for example, secure session, web browsing session, or banking transactions), protocol type (for example, transport, application protocols, or protocol combinations), called user device (for example, specific IP address, IMSI, or URL), parameters for very specific tracking (for example, transport port number and transport header value).

The LI intent information may be received in a format that is agreed with the network operator. This format, for example, may include using simple tag-length-values in nested structures (to form an information hierarchy where needed). The additional information received from LEA 108 may also include an LEA feedback that may be optionally received at the end of an LI session. In order to receive the LI intent information at the start of an LI session and to obtain the LEA feedback from LEA 108 at the end of the LI session, the X1 interface is accordingly enhanced. An LI session is the interval between start and end of LI operation for a particular target user by LEA 108, based on the provisioning. LEA 108 may separately provision the start of LI and end of LI for a LI target, or may specify the end-time of LI for the LI target when provisioning the start of LI itself. So, a LI session is different from a user communication session, and refers to the time of provisioning LI for a target user. An LI session may include zero, one, or more user sessions, depending on whether the target user was involved in zero, one, or more user sessions during the time of the LI session. Provisioning module 202 further shares the LI intent information with a LI intent analyzer module 204.

After receiving the LI intent information, LI intent analyzer module 204 interprets LI intent from the LI intent information and maps the LI intent to appropriate LI content that is required to be sent to LEA 108. Mapping of the LI intent to the LI content is done using an LI content lookup table. The initial values in the LI content lookup table are provisioned by the operator, and may be subsequently modified based on the LEA feedback received from LEA 108 and the self-learning performed by auto-tuning module 208. In an exemplary embodiment, the LI content lookup table (LI_CONTENT_LKUP_TBL) may be represented using the table 1 given below:

TABLE 1

| 1st level Intent | 2nd level Intent | 3rd level Intent | LI content to be sent to LEA 108 |
|---|---|---|---|
| Voice calls | Circuit-switched | 2G | Circuit-switched 2G voice content<br>Session details - e.g., users, session characteristics, duration, etc.<br>In-band signaling info |
| | | 3G | Circuit-switched 2G voice content<br>Session details - e.g., users, session characteristics, duration, etc.<br>In-band, signaling info |
| | | Wireline (PSTN) | Circuit-switched wireline (PSTN) voice content<br>Session details - e.g., users, session characteristics, duration, etc.<br>In-band signaling info |
| | Packet-switched | Voice over LTE (VoLTE) | VoLTE call contents<br>Session setup and teardown details<br>SIP message info |
| | | VoWiFi (Voice over Wi-Fi) | VoWiFi call contents |
| | | Using 3rd party application (specific details of the app could be provided, or it could be left generic) | Data session contents which involve Real-time transport protocol (RTP) packet exchange<br>Signaling details, services used details |
| | | IP-Multimedia subsystem (IMS) call | RTP contents<br>Session Initiation Protocol (SIP) messages, services invoked, etc, |
| Secure transactions | Secure traffic (e.g., https, tls, ipsec) | | Contents of data session with secure protocols involved<br>Details of peer in the transaction, redirections involved for authentication, etc.<br>Encryption keys used |
| | Banking site access | | Contents of data session involving access to banking sites<br>Details of banking site(s) |

In the LI_CONTENT_LKUP_TBL depicted by table 1 above, three levels are shown merely for illustrative purpose and an LI content lookup table may include more than three levels, or may have less than three levels.

LI intent analyzer module 204 also determines one or more LI triggers associated with the LI content required by LEA 108 based on an analysis of the LI intent information received from LEA 108. The one or more LI triggers are determined by using an LI trigger lookup table. This has been described in detail in conjunction with FIGS. 4 and 5. The initial values in the LI trigger lookup table are provisioned by the operator, and may subsequently be modified by auto-tuning module 208 based on the LEA feedback and self-learning. In an exemplary embodiment, the LI trigger lookup table (LI_START_STOP_TRIGGER_LKUP_TBL) may be represented using the table 2 given below:

TABLE 2

| 1st level Intent | 2nd level Intent | Start LI Trigger(s) | Stop LI Trigger(s) |
|---|---|---|---|
| Voice calls | Circuit-switched | Receipt of CC SETUP/Sending of SETUP message (as NAS payload in Direct Transfer message (3G call). | Receipt/sending of CC RELEASE message (3G call). |
| | | Receipt/sending of Signaling Initial Address Message. | Receipt/sending of Release Message. |
| | | Receipt/sending of a Digital Signaling System No. 1 (DSS1) setup message | Receipt/sending of a DSS1 release message |
| | Packet-switched | Receipt/sending of SIP INVITE/Re-INVITE message with voice codecs such as G.711, G.729.<br>Receipt/sending of a SIP REFER message | Receipt/sending of SIP BYE, CANCEL or a 3xx/4xx/5xx/6xx response messages. |

TABLE 2-continued

| 1st level Intent | 2nd level Intent | Start LI Trigger(s) | Stop LI Trigger(s) |
|---|---|---|---|
| Secure transactions | Secure traffic (e.g., https, tls, ipsec) | Receipt of a packet with application layer as https and/or transport layer as Transport Layer Security (TLS) and/or network layer packet as an ipsec packet | |
| | Banking site access | Packets to/from a banking site (known based on access to a local database or queried from an external database) | |

In the LI_START_STOP_TRIGGER_LKUP_TBL depicted by table 2 above, two levels and the list of LI triggers are shown merely for illustrative purpose and the LI trigger lookup table may include more than two levels and additional LI triggers. Additional LI triggers may also be provisioned as optional LI triggers. These optional LI triggers enable monitoring, reporting, and subsequent self-learning. For example, such an optional trigger could be based on whether the SIP INVITE transaction was followed after some time by RTP exchange (denoting media flow) between users.

In order to enable detection of match of the one or more LI triggers, LI intent analyzer module 204 determines possible trigger detection network nodes that can detect the one or more LI triggers using a network node detection lookup table. The network node detection lookup table includes a list of network nodes and the associated LI triggers that they are capable of detecting. In an exemplary embodiment, the network node detection lookup table (DETECT_NODE_LKUP_TBL) may be represented by table 3 given below:

TABLE 3

| Network Node | LI Trigger condition(s) that can be detected |
|---|---|
| eNodeB | User location, connection state, handover, mobility-related aspects, etc. |
| Mobile Switching Center (MSC) | Session setup, teardown, session modification, etc. |
| Packet Data Network (PDN) Gateway (PGW) | Specific protocol-level condition matches based on DPI (Deep Packet Inspection), handover to/from Wi Fi access, etc. |
| Serving Call Session Control Function (S-CSCF) | SIP session setup, modification, teardown, services invoked, session characteristic match, etc. |
| Media Gateway (MGW) | In-band signaling events, etc. |

It will be apparent to a person skilled in the art that the list of network nodes and associated LI triggers given in the DETECT_NODE_LKUP_TBL depicted by table 3 above are not exhaustive.

LI intent analyzer module 204 also determines markers that should be used for 'marking' the LI content that matches the LI intent of LEA 108. Examples of the markers may include, but are not limited to an IP packet with options field=01 (where, 01 indicates voice packets), an IP packet with protocol header field having an unassigned value (for example, a value between 143 and 252). LI intent analyzer module 204 also provides relevant inputs to an Appropriate Content Duplication Element (ACDE) selection module 206 and stores relevant historical data.

ACDE selection module 206 selects the ACDE (which may be LI CDF module 106) and additionally determines the Appropriate Trigger Detection Nodes (ATDNs). ACDE selection module 206 sends information regarding LI trigger matching conditions to a server node (which may be the SCS) that is in communication with the ACDE and the ATDNs, and shares the LI trigger matching conditions with the ACDE and the ATDNs.

The ACDE receives information regarding LI triggers along with instructions to start or stop sending LI content to a server node (which may be the SCS). The ACDE starts or stops sending LI content upon matching of the LI triggers received from the server node or in response to a notification received from the server node to start or stop sending LI content. The ACDE also retains the raw LI content for pre-provisioned duration which is in accordance with the regulations of the LEA jurisdiction. The ACDE may include a Gateway Control System (GCS) and Gateway System (GWS). In this case, the LI signaling and notification events would be communicated with the server node via the GCS and the LI media content of an LI session would be communicated to the server node by the GWS. By way of an example, in this case, the ACDE may be an IMS Media Gateway Control Function (MGCF) (which acts as GCS) and Media Gateway (MGW) (which acts as GWS). Alternatively, the ACDE may be a monolithic component. In other words, the ACDE is not further split into logical Network Elements (NEs). By way of an example, such an ACDE may be an Long Term Evolution Packet Data Network Gateway (LTE PGW).

An ATDN determined by ACDE selection module 206 may be any node in the network that is capable of receiving instructions from a server node (for example, the SCS) to monitor matching of certain conditions that may indicate matching of one or more LI triggers, monitor these conditions in response to the instructions, and then report to the server node when one or more of these condition have matched along with relevant details. These relevant details may include, but are not limited to matching events and associated time of matching. Examples of these conditions may include, but are not limited to handover, location change, or offloading. A network node, if not already capable, may be enhanced to act as an ATDN. Examples of network nodes that may act as an ATDN, may include, but are not limited to eNodeB, a Serving Gateway (SGW), a Wi-Fi Access Point (AP), a Trusted Wireless Access Gateway (TWAG), a Packet Data Network Gateway (PGW), or a Media Gateway Control Function+Media Gateway (MGCF+MGW). In an embodiment, when the environment in which the claimed invention is performed does not include controller node 200, ATDN or ACDE selection may be performed by an existing network node. For example, in case of an IP Multimedia Subsystem (IMS) session that involves the target user, ATDN or ACDE selection may be performed by a Serving-Call Session Control Function (S-CSCF).

Once the LI session has ended, an auto-tuning module 208 analyzes collected data to update the confidence level of partial trigger matches and updates historical data. Auto-tuning module 208 also receives the LEA feedback from LEA 108 through provisioning module 202. The LEA feedback includes information on relevance of duplicated LI content sent to the LEA. This relevance information is then used by auto-tuning module 208 to update historical data. The analysis of collected data and the feedback received from LEA 108 are also used to update the look up tables, for example, the LI_CONTENT_LKUP_TBL and LI_START_STOP_TRIGGER_LKUP_TBL.

Figure 3:
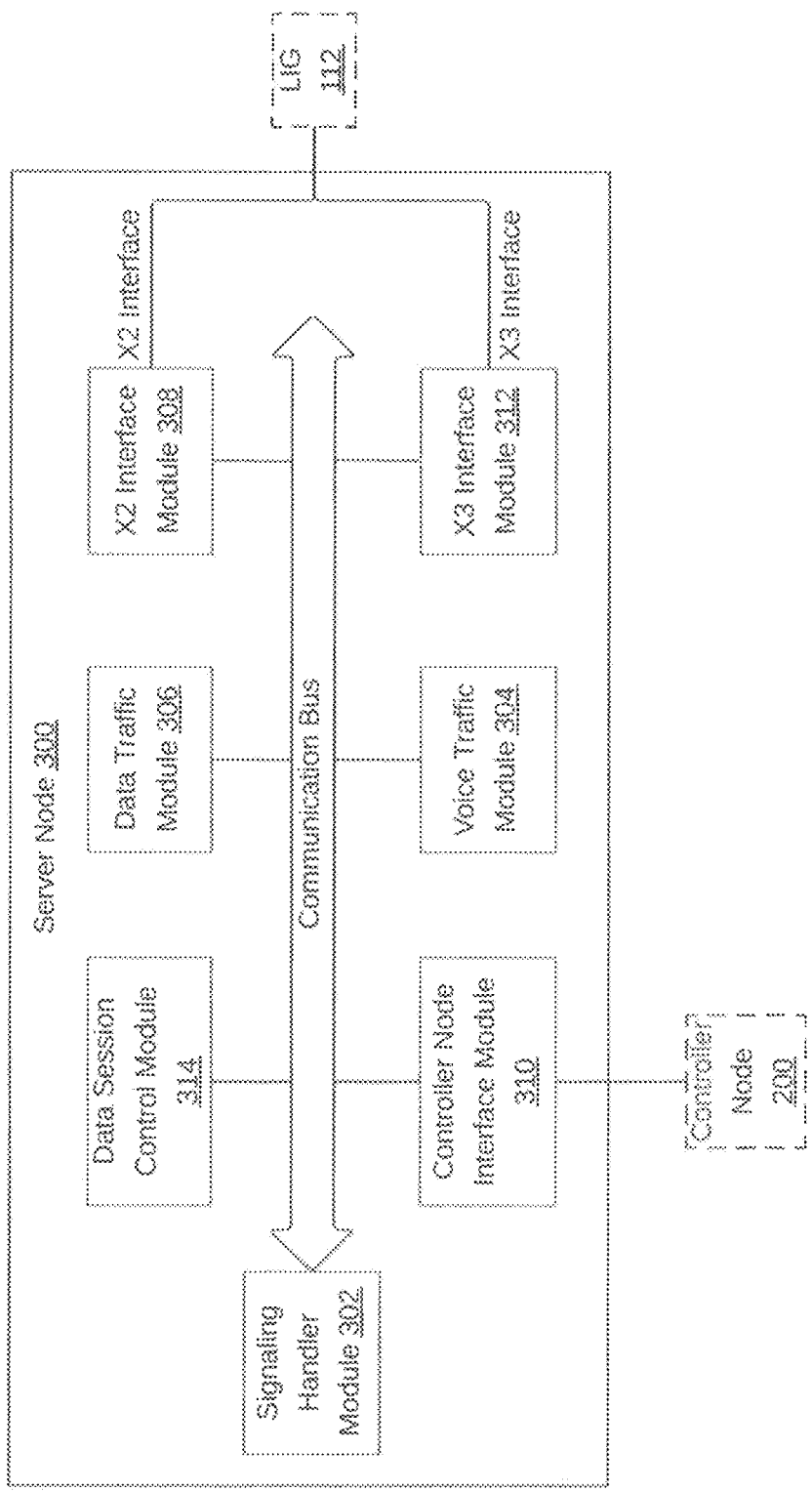
FIG. 3 is a block diagram illustrating various modules of a server node for intent based LI in a communication network, in accordance with an embodiment.

Controller node 200 also includes a server node selection mode 210 that selects the server node (which may be the SCS). The communication of various modules of controller node 200 with the server node is facilitated by a server interface module 212 that passes additional information (described in this invention) received from the server node to appropriate modules in controller node 200. Server interface module 212 also sends additional information (described in this invention) received from various modules in controller node 200 to the server node. The server node and its modules are explained in detail in conjunction with FIG. 3. Referring now to FIG. 3 a block diagram of various modules in a server node 300 for intent based LI in a communication network is illustrated, in accordance with an embodiment. In an embodiment, server node 300 may be an SCS. Server node 300 includes a signaling handler module 302 that collects information on the number of LI trigger matches, duration of LI trigger match, delay between LI trigger match and start of sending of LI content to LIG 112. Based on whether the LI trigger match corresponds to a start LI trigger or stop LI trigger for sending of duplicated LI content to LEA 108, signaling handler module 302 sends notification to the ACDE to start or stop sending duplicated LI content.

When there is a partial trigger match, signaling handler module 302 determines the confidence level of the partial trigger match. If the confidence level is greater than a predefined threshold, signaling handler module 302 sends a notification to the ACDE to start sending duplicated LI content and also stores details of the confidence level computed above. Signaling handler module 302 also receives notifications from the ATDNs on LI trigger matches and passes these notifications to a voice traffic module 304 for voice sessions and to a data traffic module 306 for data sessions.

Voice traffic module 304 receives information from ACDE selection module 206 and determines the start and stop LI triggers for sending duplicated LI content. This is then passed on to the ACDE and to the ATDNs. In response to instructions received from ACDE selection module 206, voice traffic module 304 inserts markers in the duplicated LI content before sending it to LIG 112 via an X3 interface module 312 using an X3 interface. ACDE selection module 206 passes instructions about markers to the Voice traffic module 304 based on inputs received from LI intent analyzer module 204. Each marker packet is small in size (to avoid delay for raw data) and has a flag in the header (for example, an unused protocol bit), so that LEA 108 is able to differentiate between a raw data packet and a marker packet. As a result, LEA 108 would easily be able to separate out the marker data and retrieve raw data. To this end, voice traffic module 304 provides to the X2 interface and the X3 interface, information regarding correlation between marker packets and raw data packets. Voice traffic module 304 also sends notification to LIG 112 via an X2 interface module 308 over the X2 interface and to controller node 200 via a controller node interface module 310. The notification includes information about the LI operation for the LI session, which includes LI trigger matches, frequency and duration of these LI trigger matches.

Similarly, data traffic module 306 receives instructions from ACDE selection module 206 (including inputs received from LI intent analyzer module 204, for example, information about markers to be inserted in the LI content), and based on these instructions, data traffic module 306 inserts markers in the LI content before sending it to LIG 112 via X3 interface module 312 using an X3 interface. Each marker packet is small in size (to avoid delay for raw data) and has a flag in the header (for example, an unused protocol bit), so that LEA 108 is able to differentiate between a raw data packet and a marker packet. Data traffic module 306 also sends appropriate notifications to LIG 112 via X2 interface module 308 through an X2 interface. Data traffic module 306 also provides to the X2 interface and the X3 interface, information regarding correlation between marker packets and raw data packets.

Server node 300 also includes a data session control module 314 that determines start LI triggers and stop LI triggers that need to be passed on to the ACDE and to the ATDNs based on inputs received from ACDE selection module 206. Subsequent to this determination, data session control module 314 passes this information to the ACDE and the ATDNs. Data session control module 314 also passes this information to signaling handler module 302. Communication of various modules in server node 300 with controller node 200 is enabled by controller node interface module 310.

Figure 4:
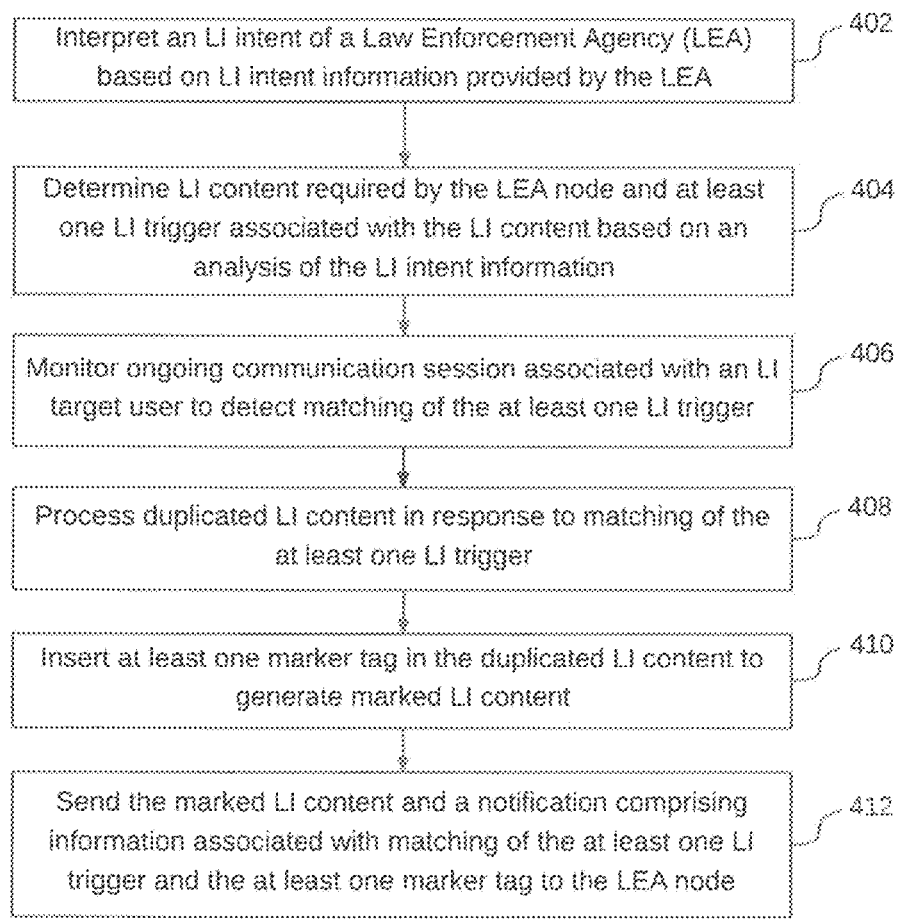
FIG. 4 illustrates a flow chart of a method for performing intent based LI in a communication network, in accordance with an embodiment.

Referring now to FIG. 4, a method of intent based LI in a communication network is illustrated, in accordance with an embodiment. At start of an LI session, LI specification along with LI intent information is first received from LEA 108 by a network device. The network device may be controller node 200 that receives the LI specification along with the LI intent information from LEA 108 via LIG 112 over the X1 interface. In an embodiment, the network device may be a network equipment. Provisioning module 202 then analyzes the LI intent information to determine identities of one or more LI target users and passes this information to a server node selection module 210 and ACDE selection module 206. Provisioning module 202 may also receive inputs on the confidence level of intent matching that should be satisfied for sending duplicated LI content to LEA 108. Provisioning module 202 sends the LI intent information received from LEA 108 to LI intent analyzer module 204.

At 402, the network device, which may be controller node 200, interprets an intent of LEA 108 with reference to LI for a target user, based on the LI intent information provided by the LEA. At 404, the network device determines LI content required by LEA 108 based on an analysis of the LI intent information. In an embodiment, once LI intent analyzer module 204 has received the LI intent information, it determines appropriate LI content that needs to be sent to LEA 108 by mapping the LI intent indicated by the LI intent information to appropriate LI content using the LI content lookup table. While using the LI content lookup table, LI intent analyzer module 204 starts from the high-level intent entries and then progressively looks up the entries in subsequent levels until a match for appropriate LI content found. Since there is no restriction on LEA 108 for specifying the intent (i.e., only one high-level intent or multiple detailed levels of intent), all the intent levels in the content lookup table may have to be scanned by intent analyzer module 204 to determine the appropriate LI content to be sent to LEA 108. In exemplary embodiment, with reference to the LI_CONTENT_LKUP_TBL depicted in table 1, LI intent analyzer module 204 starts from the 1st level intent entries and then progressively looks up the entries in the 2nd level intent and the 3rd level intent until a match is found.

At 404, LI intent analyzer module 204 also determines one or more LI triggers associated with the LI content required by LEA 108. To determine when to start and stop sending the appropriate LI content required by LEA, LI intent analyzer module 204 determines relevant start LI triggers and LI stop triggers using the LI trigger lookup table. After determining the start LI trigger and the stop LI trigger, LI intent analyzer module 204 formulates a suitable conditional expression to represent the same. In an exemplary embodiment, referring to LI_START_STOP_TRIGGER_LKUP_TBL depicted in table 2 and to LI_CONTENT_LKUP_TBL depicted in table 1, since the intent could be composed of one or more of service type, location of LI target user, access network type, session type and protocol type, an LI trigger may include a combination of conditions. For example, the LI intent may be to track all circuit-switched voice calls of the target user made from a particular location. Thus, the first level of intent is "Voice calls" and the second level of intent is "circuit switched." Accordingly, the start LI triggers and the stop LI trigger triggers matching these this intent would be fetched from LI_START_STOP_TRIGGER_LKUP_TBL. Thereafter, a conditional expression is formulated using the above triggers that also includes the location constraint specified in the LI intent.

After LI intent analyzer module 204 determines the LI intent required by LEA 108 and the one or more LI triggers associated with the LI intent, it determines possible trigger detection network nodes that can detect each of the one or more LI triggers. These trigger detection network nodes are determined using a network node detection lookup table. In an exemplary embodiment, DETECT_NODE_LKUP_TBL depicted by table 3 is used for determining possible trigger detection network nodes. In an embodiment, a single conditional expression formulated by LI intent analyzer module 204 may require multiple trigger detection network nodes, for detecting the one or more triggers. For example, the LI intent information specifies that voice calls made only from a certain location should be tracked. In this case, the trigger detection network node for detecting the location information of the target user who has only LTE connectivity may be the eNodeB in an LTE network and the trigger detection network node for detecting the session setup attempt may be the Packet Data Network Gateway (PGW) in an LTE network.

Once the possible trigger detection network nodes have been determined by LI intent analyzer module 204, one or more of these possible trigger detection network nodes are used to monitor ongoing communication session associated with the LI target user at 406, in order to detect matching of the one or more LI triggers. In an embodiment, once LI intent analyzer module 204 has determined the possible trigger detection network nodes, ACDE selection module 206 determines if one or more selected ACDEs can detect the one or more LI triggers in order to start or stop sending the LI content to LEA 108. If the one or more selected ACDEs can detect each of the one or more LI triggers, ACDE selection module 206 sends details of the one or more LI triggers to signaling handler module 302 in server node 300. Signaling handler module 302 further sends this information to the one or more ACDEs and to voice traffic module 304 and data traffic module 306.

However, if ACDE selection module 206 determines that the one or more selected ACDEs are not capable of detecting the one or more LI triggers, ACDE selection module 206 determines one or more ATDNs for each of the one or more LI triggers from the list of possible trigger detection network nodes as determined by LI intent analyzer module 204. To this end, for each of the one or more LI triggers that cannot be detected by the one or more ACDEs, ACDE selection module 206 arranges one or more CDEs (that can perform functionalities of an ATDN), in ascending order of distances from server node 300 and selects the first CDE which is not under overload or whose network segment is not congested. If no such CDE is available, ACDE selection module 206 arranges a list of possible trigger detection network nodes in ascending order of distances from server node 300. In an embodiment, ACDE selection module 206 may use DETECT_NODE_LKUP_TBL depicted by table 3.

Thereafter, ACDE selection module 206 selects the first trigger detection network node as an ATDN, such that, this trigger detection network node is not overloaded or the network segment associated with it is not congested. In absence of such information's availability at server node 300, ACDE selection module 206 selects the trigger detection network node that is closest to server node 300 as an ATDN. However, when two or more trigger detection network nodes are equidistant from server node 300 and have same load and network conditions, ACDE selection module 206 selects the trigger detection network node that is closest to a User Equipment of the LI target user.

Once, ACDE selection module 206 determines the one or more ATDNs, it sends details regarding the one or more LI triggers to signaling handler module 302 in server node 300. Signaling handler module 302 further sends this information to the one or more ATDNs and to voice traffic module 304 and data traffic module 306. Additionally, LI intent analyzer module 204 determines marker tags that would be used for 'marking' relevant duplicated LI content that match the intent of LEA 108 based on provisioned market tag data provided by LEA 108. However, if no such provisioned marker tag data is available, LI intent analyzer module 204 uses meaningful marker tags, which may include, for example, first few characters of the intent parameter value. Thereafter, LI intent analyzer module 204 communicates information regarding the marker tags to LIG 112.

Thereafter, at 406, the ACDE and/or the one or more ATDNs monitor ongoing communication session associated with the LI target user to detect matching of the one or more LI trigger. In an embodiment, such monitoring may involve monitoring of signaling events as well as examining of user session contents (header inspection as well as deep packet inspection).

While monitoring the ongoing communication session of the LI target user, if the ACDE or the one or more ATDNs detect matching of one or more LI triggers, they process, at 408, duplicated LI content that captures one or more parts of the LI content in the ongoing communication session. Processing of the duplicated LI content may include initiating sending one or more parts of the duplicated LI content to LEA 108, when match of one or more start LI triggers is detected. Further, when matching of one or more stop LI triggers is detected, sending of one or more parts of the duplicated LI content to LEA 108 is terminated.

In an embodiment, when trigger conditions that indicate match of the one or more LI triggers are matched in the ACDE, the ACDE starts or stops sending (depending on whether the start LI trigger(s) or the stop LI trigger(s) was matched) the relevant duplicated LI content to voice traffic module 304 for the LI target user's voice session and to data traffic module 306 for the LI target user's data session respectively. The ACDE also sends notification about trigger matches to voice traffic module 304 and data traffic module 306 in server node 300.

In another embodiment, trigger conditions that indicate matching of the one or more LI triggers are matched in the ATDN. In this case, the ATDN sends notification to signaling handler module 302 in server node 300 about matching of the one or more LI triggers. Signaling handler module 302 stores these details and determines whether the match of the one or more LI triggers is complete and not partial. When the match is complete, signaling handler module 302 sends an instruction to the ACDE or to one or more ATDNs to start or stop sending duplicated LI content to voice traffic module 304 and data traffic module 306 for LI target user's voice sessions and data sessions respectively. Accordingly, the ACDE or one or more ATDNs start or stop sending duplicated LI content.

In one embodiment, the ACDE sends duplicated LI content of a finite pre-provisioned duration prior to receiving the instruction from signaling handler module 302. As a result, any loss of duplicated LI content that may occur due to delay between matching of the one more LI triggers and reception of instruction by the ACDE to start sending duplicated LI content, is avoided. Additionally, the ACDE stores the duplicated LI content for a finite pre-provisioned duration locally. This enables LEA 108 to get any additional information if needed through existing offline mechanisms.

However, when the match of the one or more LI triggers is partial, signaling handler module 302 determines a confidence level associated with partial matching of the one or more LI triggers based on historical data associated with partial matching of LI triggers. Signaling handler module 302 retrieves the historical data from auto tuning module 208. In an embodiment, confidence level may be computed by using the equation given below:

Confidence Level=% of times a partial match of an LI trigger resulted in a complete match of that LI trigger The above information may be determined based on historical data retrieved from auto-tuning module 208 or based on explicit feedback from LEA 108 received earlier. Thereafter, signaling handler module 302 compares the confidence level with a predefined confidence level. Only when the confidence level is greater than the predefined confidence level, signaling handler module 302 sends an instruction to the ACDE or one or more ATDNs to start or stop sending duplicated LI content to voice traffic module 304 and data traffic module 306 for LI target user's voice session and data session respectively. Voice traffic module 304 and data traffic module 306 then consolidate duplicated LI content received from multiple ACDEs or ATDNs for LI target user's voice and data sessions.

At 410, a network device, which may be server node 300, inserts one or more marker tags in the duplicated LI content to generate marked LI content. In an embodiment, for LI target user's communication session, voice traffic module 304 and data traffic module 306, respectively for voice sessions and data sessions, group and consolidate relevant duplicated LI content (which correspond to the LI intent) received after matching of the one or more LI triggers. Thereafter, these modules insert appropriate markers in the duplicated LI content.

Thereafter, at 412, the network device, which may be server node 300, sends the marked LI content to LEA 108 via LIG 112. In an embodiment, voice traffic module 304 and data traffic module 306 send the marked LI content to LIG 112 over the X3 interface via X3 interface module 312. These modules also send, at 412, a notification that includes information associated with matching of the one or more LI triggers and information associated with the one or more marker tags. After end of the LI session, voice traffic module 304 and data traffic module 306 also send a session ending report to LIG 112 over the X2 interface via the X2 interface module 308. The session ending report includes frequency and duration of matching of the one or more LI triggers and the amount of delay between match of the one or more LI triggers and start of sending duplicated LI content to LEA 108. The amount of delay might be significant if detection of match of the one or more LI triggers happened at an ATDN and not at the ACDE. The above notification is also sent to auto tuning module 208 in controller node 200.

Once the LI session has ended, the network device performs auto-tuning of confidence levels associated with partial LI trigger matches and the lookup tables. The auto-tuning may be performed by auto-tuning module 208 based on LEA feedback received from LEA 108 and analysis of LI trigger matching events. The LEA feedback includes relevance of the LI content received by LEA 108, when compared to the intent of LEA 108. This is further explained in detail in conjunction with FIGS. 5A and 5B.

Figure 5A:
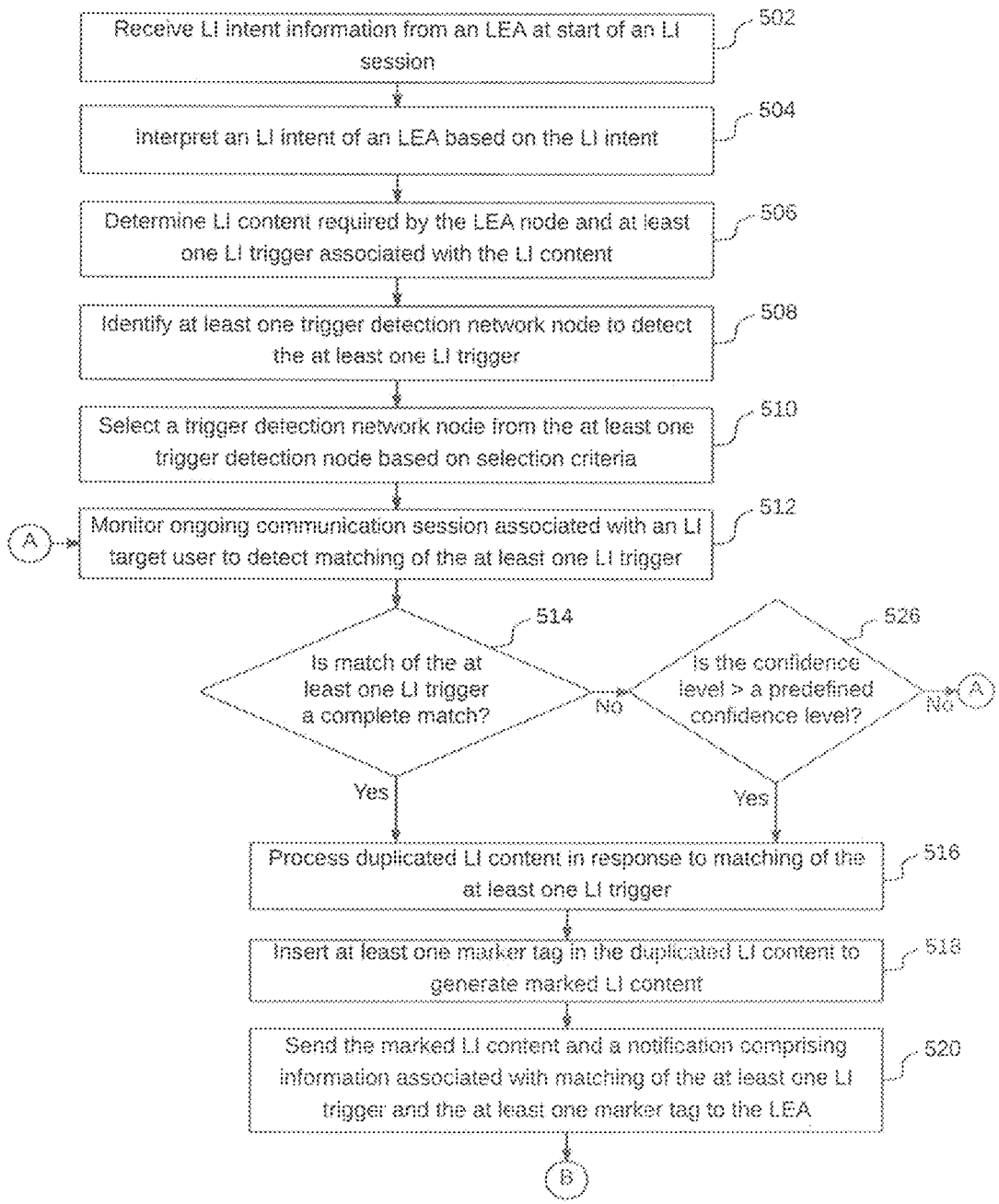
FIGS. 5A and 5B illustrate a flow chart of a method for performing intent based LI in a communication network, in accordance with another embodiment.
Figure 5B:
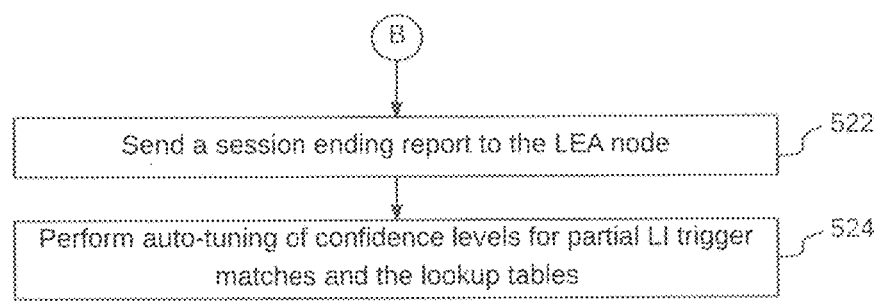

Referring now to FIGS. 5A and 5B, a method of intent based LI in a communication network is illustrated, in accordance with another embodiment. When an LI session starts, LI intent information is received from LEA 108, at 502. The LI intent information is associated with an intent of LEA 108 to initiate the LI for a target user. At 504, an intent of LEA 108 to initiate the LI for a target user is interpreted based on the LI intent information provided by the LEA. Thereafter, at 506, LI content required by LEA 108 and one or more LI triggers associated with the LI content is determined based on an analysis of the LI intent information. This has been explained in detail in conjunction with FIG. 4.

At 508, one or more trigger detection network nodes are identified to detect the one or more LI triggers. Thereafter, at 510, a trigger detection network node is selected from the one or more trigger detection nodes based on selection criteria. Once the trigger detection network node is selected, it monitors ongoing communication session associated with an LI target user to detect matching of the one or more LI triggers at 512. Based on the monitoring, match of the one or more LI triggers may be detected.

At 514, a check is performed to determine whether match of the one or more LI triggers is complete or not. When the one or more LI triggers have a complete match, duplicated LI content is processed in response to matching of the one or more LI triggers at 516. Thereafter, at 518 one or more marker tags are inserted in the duplicated LI content to generate marked LI content. The marked LI content and a notification is then sent to LEA 108 at 520. The notification includes information associated with matching of the one or more LI trigger and the one or more marker tags. When the LI session ends, a session ending report is also sent to LEA 108 at 522. This has been explained in detail in conjunction with FIG. 4.

Thereafter, at 524, auto-tuning of confidence levels associated with partial LI trigger matching and the lookup tables is performed. The auto-tuning may be performed by auto-tuning module 208 based on LEA feedback received from LEA 108 and analysis of LI trigger matching events. The LEA feedback includes relevance of the LI content received by LEA 108, when compared to the intent of LEA 108. In an embodiment, auto-tuning module 208 in controller node 200 adapts the confidence level for partial LI trigger matches and the lookup tables.

To this end, auto-tuning module 208 analyzes the LI trigger matching events stored for the LI session and determines the instances when a partial match of an LI trigger was followed by a complete match of the LI trigger subsequently. Auto-tuning module 208 also analyzes other events reported during the LI session. Examples of these events may include, but are not limited to an optional trigger of Real-time Transport Protocol (RTP) flow following a session setup using Session Initiation Protocol (SIP).

Auto-tuning module 208 may also receive LEA feedback from LEA 108 through provisioning module 202. The LEA feedback is optional and may not be received after end of every LI session. The LEA feedback relates to relevance of duplicated LI content sent in case of partial match of LI content. This would happen, when duplicated LI content is sent in response to partial match of one or more LI triggers derived from the LI intent specified by LEA 108. Auto-tuning module 208 then takes a simple or weighted average of the above information. The average is then used by auto-tuning module 208 to update the historical database for partial LI trigger matches. Also, if the average is greater than a pre-provisioned threshold, auto-tuning module 208 also updates the LI trigger lookup table (for example, LI_START_STOP_TRIGGER_LKUP_TBL) for event triggers that correspond to the LI intent.

Auto-tuning module 208 also adapts the content lookup table (for example, LI_CONTENT_LKUP_TBL). To this end, for the cases where a partial match of an LI trigger was followed by a complete match of the LI trigger subsequently, auto-tuning module 208 determines if the events and relevant LI content were sent upon occurrence of partial match of a LI trigger (i.e., prior to complete match of the LI trigger). Auto-tuning module 208 may also receive LEA feedback from LEA 108 on relevance or completeness of LI content sent to LEA 108 when compared to the LI intent specified by LEA 108 for the LI session. Auto-tuning module 208 then aggregates the above inputs, for example, by taking a weighted average for each information element. When the weighted average exceeds a pre-provisioned threshold, auto-tuning module updates the content lookup table (for example LI_CONTENT_LKUP_TBL).

Referring back to 514, if the matching of the one or more LI triggers is partial, a check is performed at 526 to determine if the confidence level associated with partial matching of the one or more LI triggers is greater than a predefined confidence level. If the confidence level is greater than the predefined confidence level, control goes to 516. However, if the confidence level is lower than or equal to the predefined confidence level, control moves to 512.

Figure 6:
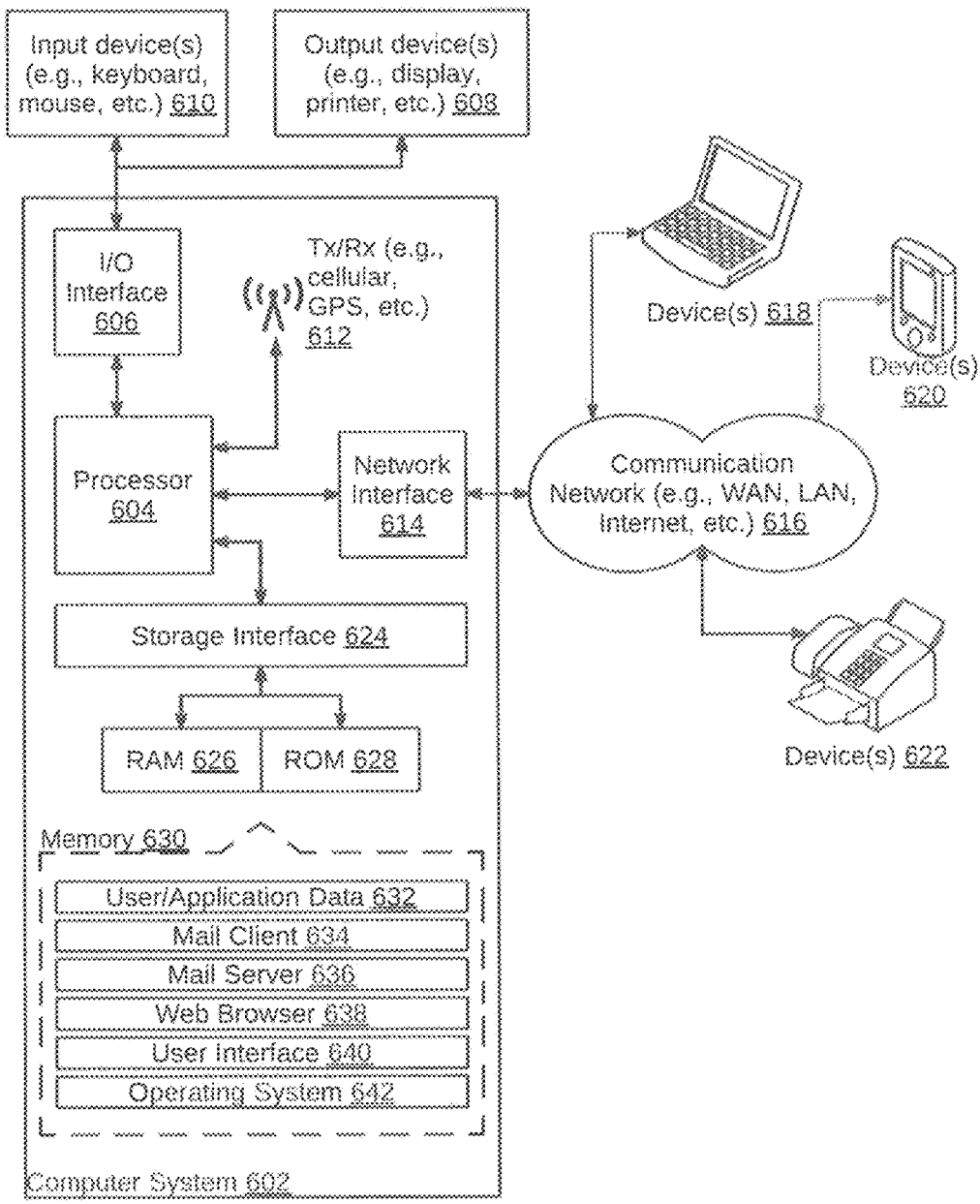
FIG. 6 illustrates a block diagram of an exemplary computer system for implementing various embodiments.

FIG. 6 is a block diagram of an exemplary computer system for implementing various embodiments. Computer system 602 may comprise a central processing unit ("CPU" or "processor") 604. Processor 604 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athion, Duron or Opteron, ARM's application, embedded or secure processors, IBM PowerPC, Intel's Core, Itanium, Xeon, Celeron or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory devices 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 630 may store a collection of program or database components, including, without limitation, an operating system 632, a user interface application 634, a web browser 636, a mail server 638, a mail client 640, a user/application data 642 (e.g., any data variables or data records discussed in this disclosure), etc. Operating system 632 may facilitate resource management and operation of the computer system 602. Examples of operating system 632 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 602 may implement web browser 636 stored program component. Web browser 636 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 602 may implement mail server 638 stored program component. Mail server 638 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement mail client 640 stored program component. Mail client 640 may be a mail viewing application, such as Apple Mail, Microsoft Entourage, Microsoft Outlook, Mozilla Thunderbird, etc.

In some embodiments, computer system 602 may store user/application data 642, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide methods and systems of intent-based LI in communication networks. These methods and systems provide a mechanism for intent-based LI for selective content gathering and extraction of relevant information by an LEA on a real-time basis for effective LI while minimizing network overheads. The method includes interpretation of LI intent, selective content gathering based on intent on real-time basis, marking of relevant information in the selectively sent content on real-time basis, and minimizing network overhead by efficient selection of ACDEs and ATDNs.

The specification has described methods and systems of intent-based LI in communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of intent based Lawful Interception (LI) in a communication network, the method comprising:
   interpreting, by a network device, an LI intent of a Law Enforcement Agency (LEA) based on LI intent information provided by the LEA;
   determining, by the network device, LI content required by the LEA and at least one LI trigger associated with the LI content based on an analysis of the LI intent information, wherein the determination of the at least one LI trigger is based on an identification of at least one trigger detection network node based on a network node lookup table;
   monitoring, by the network device, ongoing communication session associated with an LI target user to detect matching of the at least one LI trigger;
   processing, by the network device, duplicated LI content in response to matching of the at least one LI trigger, wherein the duplicated LI content captures at least a part of the LI content in the ongoing communication session of the LI target user;
   inserting, by the network device, at least one marker tag in the duplicated LI content to generate marked LI content; and
   sending, by the network device, the marked LI content and a notification comprising information associated with matching of the at least one LI trigger and the at least one marker tag to the LEA.

2. The method of claim 1 further comprising selecting a trigger detection network node from the at least one trigger detection node based on selection criteria comprising: location of the trigger detection node in the communication network, current load on the trigger detection node, and traffic conditions in network segments associated with the trigger detection node.

3. The method of claim 2, wherein the trigger detection node is selected when a content duplication node lacks capability to detect at least one of the at least one LI trigger.

4. The method of claim 1, wherein processing duplicated LI content comprises:
   initiating sending at least a part of the duplicated LI content based on matching of at least one start LI trigger from the at least one LI trigger; and
   terminating sending at least a part of the duplicated LI content based on matching of at least one stop LI trigger from the at least one LI trigger.

5. The method of claim 1 further comprising determining a confidence level associated with matching of the at least one LI trigger based on historical data associated with partial matching of the at least one LI trigger, the confidence level being determined in response to partial matching of the at least one LI trigger.

6. The method of claim 5 further comprising comparing the confidence level with a predefined confidence level, wherein the content duplication is selectively performed, when the confidence level is greater than the predefined confidence level.

7. The method of claim 1 further comprising receiving the LI intent information from the LEA at start of an LI session.

8. The method of claim 1, wherein the LI intent information comprises lookup tables, the lookup tables being used to determine the LI content required by the LEA and the at least one LI trigger.

9. The method of claim 1 further comprising performing auto-tuning of confidence levels for partial LI trigger matches and the lookup tables, based on LEA's feedback and analysis of LI trigger matching events, wherein the LEA's feedback comprises relevance of the duplicated LI content received by the LEA when compared with the intent of the LEA.

10. The method of claim 1, wherein each of the at least one LI trigger comprise at least one trigger condition, the content duplication being performed in response to matching of the at least one trigger.

11. The method of claim 1 further comprising sending a session ending report to the LEA, the session ending report comprising information associated with number of LI triggers that were matched, frequency and duration of matching of the LI triggers, delay between detection of matching of the LI triggers and initiation of content duplication.

12. A network device enabling intent based Lawful Interception (LI) in a communication network, the network device comprising:
    a processor; and
    a memory communicatively coupled to the processor, wherein the memory stores processor instructions, which, on execution, causes the processor to:
      interpret an LI intent of a Law Enforcement Agency (LEA) based on LI intent information provided by the LEA;
      determine LI content required by the LEA and at least one LI trigger associated with the LI content based on an analysis of the LI intent information, wherein the determination of the at least one LI trigger is based on an identification of at least one trigger detection network node based on a network node lookup table;
      monitor ongoing communication session associated with an LI target user to detect matching of the at least one LI trigger;
      process duplicated LI content in response to matching of the at least one LI trigger, wherein the duplicated LI content captures at least a part of the LI content in the ongoing communication session of the LI target user;
      insert at least one marker tag in the duplicated LI content to generate marked LI content; and
      send the marked LI content and a notification comprising information associated with matching of the at least one LI trigger and the at least one marker tag to the LEA.

13. The network device of claim 12, wherein the processor is further configured to select a trigger detection network node from the at least one trigger detection node based on selection criteria comprising: location of the trigger detection node in the communication network, current load on the trigger detection node, and traffic conditions in network segments associated with the trigger detection node.

14. The network device of claim 12, wherein to process duplicated LI content, the processor is further configured to:
    initiate sending at least a part of the duplicated LI content based on matching of at least one start LI trigger from the at least one LI trigger; and
    terminate sending at least a part of the duplicated LI content based on matching of at least one stop LI trigger from the at least one LI trigger.

15. The network device of claim 12, wherein the processor is further configured to determine a confidence level associated with matching of the at least one LI trigger based on historical data associated with partial matching of the at least one LI trigger, the confidence level being determined in response to partial matching of the at least one LI trigger.

16. The network device of claim 15, wherein the processor is further configured to compare the confidence level with a predefined confidence level, wherein the content duplication is selectively performed, when the confidence level is greater than the predefined confidence level.

17. The network device of claim 12, wherein the processor is further configured to perform auto-tuning of confidence levels for partial LI trigger matches and the lookup tables, based on LEA's feedback and analysis of LI trigger matching events, wherein the LEA's feedback comprises relevance of the duplicated LI content received by the LEA when compared with the intent of the LEA.

18. A non-transitory computer-readable storage medium having stored thereon, a set of computer-executable instructions for intent based Lawful Interception (LI) in a communication network, causing a computer comprising one or more processors to perform steps comprising:

interpreting, by a network device, an LI intent of a Law Enforcement Agency (LEA) based on LI intent information provided by the LEA;

determining, by the network device, LI content required by the LEA and at least one LI trigger associated with the LI content based on an analysis of the LI intent information, wherein the determination of the at least one LI trigger is based on an identification of at least one trigger detection network node based on a network node lookup table;

monitoring, by the network device, ongoing communication session associated with an LI target user to detect matching of the at least one LI trigger;

processing, by the network device, duplicated LI content in response to matching of the at least one LI trigger, wherein the duplicated LI content captures at least a part of the LI content in the ongoing communication session of the LI target user;

inserting, by the network device, at least one marker tag in the duplicated LI content to generate marked LI content; and sending, by the network device, the marked LI content and a notification comprising information associated with matching of the at least one LI trigger and the at least one marker tag to the LEA.

* * * * *